Patented May 10, 1927.

1,628,534

UNITED STATES PATENT OFFICE.

JOSEPH G. DINWIDDIE, OF PENNS GROVE, NEW JERSEY, ASSIGNOR TO E. I. DU PONT DE NEMOURS & COMPANY, OF WILMINGTON, DELAWARE, A CORPORATION OF DELAWARE.

INDOPHENOL AND PROCESS OF PRODUCING THE SAME.

No Drawing. Application filed March 18, 1924. Serial No. 700,166.

This invention relates to the production of indophenols by the condensation of carbazole compounds, and particularly carbazole itself, with para-nitrosophenol or its derivatives.

In United States Patent 919,572, there is described a method for the production of an indophenol by the condensation of nitrosophenol with carbazole in concentrated sulphuric acid so that the temperature does not rise above 30° C. It has been found that the indophenol so produced contains a very large amount of impurity which renders it unfit for the preparation of the vat dye known as Hydron blue, in a satisfactory yield and of satisfactory quality.

I have now discovered that by carrying out this condensation in such a way that the temperature of the reaction mass, either in whole or in part, does not at any time, prior to the completion of the condensation, rise above —4 or —5° C., the quality of the product obtained is markedly improved. When tested for purity this new product is found to be completely soluble in alcohol and when dissolved in warm caustic solution containing sodium hydrosulfite a practically clear lemon-yellow vat is obtained. This new product in addition gives, after treatment with an alcoholic polysulfide solution, a much larger yield of a vat dye of exceptional brilliance of shade and with an unusually clear vat in the alkaline sodium hydrosulfite solution.

The characteristic feature of this invention lies in the low temperatures of condensation and of initial cooling. The carbazole compound and the nitrosophenol compound are preferably brought together in the form of their solutions in sulfuric acid. I have found that to make sure that local overheating will not occur, especially when working on a large (plant) scale, it is necessary to pre-cool the two solutions to temperatures substantially below —20° C. the exact temperatures of the pre-cooled solutions depending, of course, to a considerable extent upon the efficiency of the external cooling means employed during the actual condensation. It is also necessary, if local overheating is to be reduced to a minimum, to vigorously stir the reaction mixture during the gradual addition of one solution to the other. Taking into account a certain amount of external cooling during the reaction (condensation) the carbazole and nitrosophenol solutions should be cooled to such temperatures before being mixed together that the average temperature of the reaction mixture throughout the major part of the period required for adding one solution to the other will not rise above —10° C. Such local overheating as may occur when the reaction mixture is being stirred will apparently not cause a local temperature increase of more than a few degrees C., say about 5° C., so that by keeping the reaction mixture well below —10° C. throughout, say, the first three quarters of the period required for the addition of one solution to the other, the increase in temperature of a small portion of the solution due to local overheating will not cause the temperature of said portion to exceed —5° C. and will not result in undesirable decomposition or side-reactions.

Cooling the two solutions before mixing to a relatively low temperature (—30 to —40° C.) has the further advantage that it makes possible the mixing of the carbazole and nitrosophenol solutions more rapidly without exceeding a temperature of —5° C. thereby shortening the period required for the mixing, and shortening the time during which the condensation product formed is subjected to the action of sulphuric acid. The conditions of the condensation,—that is, the initial temperature of the two solutions, the cooling of the reaction mixture, and the rate of addition of one solution to the other,—should preferably be so controlled that the major part of the reaction, for instance the reaction between the last 80% of the carbazole and the nitrosophenol, will take place at a temperature above —20° C., since at this temperature, or below, the speed of the condensation is very slow. The temperature of the reaction mixture may be allowed to rise gradually as the mixing of additional amounts of one solution with another proceeds, and may be allowed to reach —4° C. as the mixing is completed. As the reaction is practically instantaneous at a temperature of —4° C., it is necessary to stir only a few minutes to insure a perfect mixing.

The product to which my process is applicable can be prepared for example as follows:

One part of carbazole is dissolved in 10.0 parts of sulfuric acid (96–97%) at about 15-25° C. At the same time 0.736 parts of para-nitrosophenol are dissolved in 7.5 parts of sulfuric acid at 0° C. The carbazole solution is then cooled to about —28° C., and the nitrosophenol solution to about —40° C., when working with quantities of materials such as would be used in plant or semi-plant scale operations. The two solutions are then gradually brought together at such a rate that the addition of one to the other is completed in about 20 minutes, the temperature of the reaction mass during the greater part of said 20 minute period being less than —10° C., and the temperature at the end of said period being minus 5° C. (—5° C.). The solution is then stirred for a few minutes to make sure that the formation of ndophenol is completed, and is then drowned in 70 parts ice water below 5° C. The indophenol is filtered as quickly as possible and washed free from the bulk of acid. The material is then thrown into a solution of 1½ parts of soda ash in 70 parts of ice water and stirred until the paste is entirely alkaline. It is then filtered off and washed until the filtrate is colorless.

Technically it is often advantageous to isolate the indophenol in the leuco form. To accomplish this the acid mixture resulting from the condensation may be drowned in ice water to which a solution of sodium sulphide is simultaneously added. During the drowning the mixtures are kept at about 7° C., and after the drowning is complete they are warmed to 65° cooled, and then filtered.

Although I have described my invention with special reference to the condensation of carbazole with para-nitrosophenol, it will be understood that my invention is broadly applicable to condensations of N-substituted carbazoles, such as ethyl carbazole, with para-nitrosophenol and its homologs and other derivatives.

I claim:

1. The process of producing an indophenol which comprises condensing carbazole with a nitrosophenol at a temperature of from about —15° C. to —10° C.

2. The process of producing an indophenol which comprises condensing carbazole with a nitrosophenol at a temperature at all times substantially below —4° C.

3. The process of producing an indophenol which comprises inducing a reaction between carbazole and para-nitrosophenol in a medium of concentrated sulphuric acid and preventing the temperature of the reaction mixture or any part thereof from exceeding —4° C. until the condensation of said carbazole with said para-nitrosophenol is practically completed.

4. The process of producing an indophenol which comprises causing carbazole to react with para-nitrosophenol at a temperature at all times below —4° C. in the presence of a condensing agent.

5. The process of producing an indophenol which comprises mixing a sulfuric acid solution of carbazole with a sulfuric acid solution of a nitrosophenol, the addition of one solution to the other extending over a period of about fifteen to twenty-five minutes, and said solutions being cooled to such an extent before being brought together that the temperature of any substantial part of the reaction mixture throughout said period will not exceed —4° C.

6. The process of producing an indophenol which comprises condensing a carbazole compound with a nitrosophenol compound at a temperature at all times below —4° C., and maintaining the temperature during the greater part of the condensation between —10 and —20° C.

7. A dye composition comprising an indophenol obtainable by condensing, at a temperature at all times below —4° C., carbazole with a nitrosophenol, said indophenol being characterized by its complete solubility in alcohol, by yielding a clear lemon-yellow vat when it is dissolved in warm sodium hydroxide solution containing sodium hydrosulfite, and by reacting with alcoholic polysulphide solution to form a vat dye of exceptional brilliance of shade.

8. A dye composition as defined in claim 7 in which the indophenol is obtainable by condensing carbazole with para-nitrosophenol at a temperature at no time exceeding —4° C., and maintained during a substantial part of the condensation period between —10 and —20° C.

In testimony whereof I affix my signature.

JOSEPH G. DINWIDDIE.